US009360623B2

(12) United States Patent
Bowers et al.

(10) Patent No.: US 9,360,623 B2
(45) Date of Patent: Jun. 7, 2016

(54) BONDING OF HETEROGENEOUS MATERIAL GROWN ON SILICON TO A SILICON PHOTONIC CIRCUIT

(71) Applicant: The Regents of the University of California, Oakland, CA (US)

(72) Inventors: John E. Bowers, Santa Barbara, CA (US); Jock Bovington, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/577,938

(22) Filed: Dec. 19, 2014

(65) Prior Publication Data

US 2015/0177458 A1 Jun. 25, 2015

Related U.S. Application Data

(60) Provisional application No. 61/919,417, filed on Dec. 20, 2013.

(51) Int. Cl.
*G02B 6/13* (2006.01)
*G02B 6/12* (2006.01)

(52) U.S. Cl.
CPC .......... *G02B 6/131* (2013.01); *G02B 6/12002* (2013.01)

(58) Field of Classification Search
CPC . G02B 6/12007; G02B 6/131; G02B 6/12002
See application file for complete search history.

(56) References Cited

U.S. PATENT DOCUMENTS

| 6,962,835 | B2 * | 11/2005 | Tong | B23K 20/02 257/E21.505 |
| 7,535,089 | B2 * | 5/2009 | Fitzgerald | H01L 21/76254 257/103 |
| 7,732,237 | B2 * | 6/2010 | Xie | B82Y 10/00 257/E33.014 |
| 7,754,507 | B2 * | 7/2010 | Epler | H01L 33/0079 257/E21.511 |
| 7,851,780 | B2 * | 12/2010 | Hudait | H01L 21/02381 257/14 |
| 8,110,823 | B2 * | 2/2012 | Bowers | H01L 31/1852 257/14 |
| 8,257,990 | B2 * | 9/2012 | Koch | G02B 6/4204 257/E21.158 |
| 8,559,478 | B2 * | 10/2013 | Sysak | B82Y 20/00 372/108 |

(Continued)

OTHER PUBLICATIONS

Park et al., "Photonic Integration on the Hybrid Silicon Evanescent Device Platform," Advances in Optical Technologies, vol. 2008, Article ID 682978, 17 pages, 2008. doi:10.1155/2008/682978.*

(Continued)

*Primary Examiner* — Peter Radkowski
(74) *Attorney, Agent, or Firm* — Billion & Armitage; Michael A. Collins

(57) ABSTRACT

A method of fabricating a heterogeneous semiconductor wafer includes depositing a III-V type semiconductor epitaxial layer on a first wafer having a semiconductor substrate. The first wafer is then bonded to a second wafer having a patterned silicon layer formed on a semiconductor substrate, wherein the III-V type semiconductor epitaxial layer is bonded to the patterned silicon layer of the second wafer. The semiconductor substrate associated with the first wafer is removed to expose the III-V type semiconductor epitaxial layer.

14 Claims, 3 Drawing Sheets

(56) References Cited

U.S. PATENT DOCUMENTS

| | | | | |
|---|---|---|---|---|
| 8,604,577 | B2* | 12/2013 | Koch | G02B 6/4204 257/432 |
| 8,912,017 | B2* | 12/2014 | El-Ghoroury | H01L 27/14618 257/E21.514 |
| 2002/0009612 | A1* | 1/2002 | Ramesh | B32B 9/00 428/688 |
| 2006/0281203 | A1* | 12/2006 | Epler | H01L 33/0079 438/22 |
| 2009/0245298 | A1* | 10/2009 | Sysak | B82Y 20/00 372/22 |
| 2011/0158278 | A1* | 6/2011 | Koch | G02B 6/4204 372/45.012 |
| 2012/0189317 | A1* | 7/2012 | Heck | H01S 5/021 398/141 |
| 2012/0288995 | A1* | 11/2012 | El-Ghoroury | H01L 27/14618 438/107 |
| 2013/0208752 | A1* | 8/2013 | Koch | G02B 6/4204 372/45.012 |

OTHER PUBLICATIONS

Roelkens et al., "III—V/silicon photonics for on—chip and intra—chip optical interconnects, Laser & Photonics Review (Impact Factor: 8.01). Nov. 2010; 4(6):751-779. DOI: 10.1002/lpor. 200900033".*

Roelkens et al., "Heterogeneous Integration of III-V Active Devices on a Silicon-on-Insulator Photonic Platform," $4^{th}$ IEEE International Conference on Group IV Photonics (Sep. 2007): 1-3.

Park et al., "Device and Integration Technology for Silicon Photonic Transmitters," IEEE Journal of Selected Topics in Quantum Electronics, vol. 17, No. 3, May/Jun. 2011: 671-688.

* cited by examiner

BONDING OF HETEROGENEOUS MATERIAL GROWN ON SILICON TO A SILICON PHOTONIC CIRCUIT

CROSS-REFERENCE TO RELATED APPLICATIONS

This application claims priority to U.S. Provisional Application No. 61/919,417, titled "Bonding of Heterogeneous Material Grown on Silicon to Silicon Photonic Circuits" and filed on Dec. 20, 2013, which is incorporated herein by reference. A claim of priority is made.

GOVERNMENT SPONSORSHIP

This invention was made with Government support under contract number HR0011-12-C-0006 awarded by the Defense Advanced Research Projects Agency. The Government has certain rights in this invention.

TECHNICAL FIELD

The present disclosure relates to integrated circuit fabrication, and in particular to fabrication of optoelectronic integrated circuits.

BACKGROUND

Data communication or "Datacom" has traditionally relied on copper wires to transmit data from point to point. For example, a copper communication bus may provide communication between a processor and a data storage medium in a household PC, or between servers in a data center. Communication via a traditional copper communication bus is well understood and benefits from the fact that both the endpoint and communication medium are electrical devices.

Optical communication systems offer the promise of greater bandwidth and speed. However, optical communication systems suffer from the interface required between the optical communication system and electrical devices. In particular, coupling of optical components and electrical components typically results in electrical and optical coupling losses and/or signal distortions. These and other obstacles have been addressed by integrating the optical devices onto the integrated circuits in what is referred to as a Photonic Integrated Circuit (PIC). That is, the optical components/devices are created on semiconductor substrates that allow for integration with traditional semiconductor devices.

The semiconductor material silicon (Si) has been the backbone of integrated circuit technology for many years. However, due to the indirect bandgap of silicon—which complicates the production of light—fabrication of active optoelectronic devices has relied on a different class of semiconductor material referred to herein as III-V type semiconductors. These semiconductor materials include combinations of group III elements Aluminum (Al), Gallium (Ga), Indium (In) with group V elements Nitrogen (N), Phosphorus (P), Arsenic (As), and Antimony (Sb), and include combinations such as Gallium Arsenide (GaAs), Indium Phosphide (InP), Gallium Phosphide (GaP), Gallium Nitride (GaN), and Aluminum Gallium Arsenide (AlGaAs). A characteristic of III-V type semiconductors is the direct band gap, which allows for the fabrication of active optoelectronic devices such as lasers, photodetectors, and light-emitting diodes.

Conventional methods for integrating III-V type semiconductors with traditional silicon integrated circuits have tended to follow two approaches. In the first approach, III-V type semiconductor material is deposited directly on a silicon substrate or processed silicon layer. However, lattice constant differences between silicon and III-V type semiconductor materials results in fatal defects (e.g., dislocations) near the silicon/III-V interface. To overcome these defects, a buffer layer can be deposited between the silicon/III-V interface. However, while progress has been made to decrease the thickness of the buffer layer, thin layers can still represent a source of random, lossy defects that negatively impacts coupling between the active III-V devices and the passive silicon components (e.g., electrical circuits, waveguides, etc.). In the second approach, III-V type semiconductor material is grown on a native III-V type substrate having the same or similar lattice constant and then transferred to a silicon substrate. However, this approach is costly as the cost of producing III-V type semiconductor substrates is far greater than the cost of producing a silicon substrate. In addition, placement of the processed, active III-V device requires precise alignment between the device and the passive component (e.g., waveguide, etc.) to which it is coupled.

SUMMARY

According to one embodiment of the present invention, a method of fabricating a heterogeneous semiconductor wafer is described that includes depositing a III-V type semiconductor epitaxial layer on a first wafer having a semiconductor substrate. The first wafer is then bonded to a second wafer having a patterned silicon layer formed on a semiconductor substrate, wherein the III-V type semiconductor epitaxial layer is bonded to the patterned silicon layer of the second wafer. The semiconductor substrate associated with the first wafer is removed to expose the III-V type semiconductor epitaxial layer.

According to another embodiment, a heterogeneous wafer includes a first wafer and a second wafer. The first wafer is comprised of a semiconductor substrate and a patterned silicon layer, wherein the patterned silicon layer is formed on the semiconductor substrate. The second wafer is comprised of a semiconductor substrate and a III-V type semiconductor epitaxial layer. The second wafer is bonded to the first wafer such that the III-V type semiconductor epitaxial layer is bonded to the patterned silicon layer.

DETAILED DESCRIPTION

The present disclosure is directed generally to the fabrication of photonic integrated circuits (PICs), and in particular to methods that allow PICs to be fabricated on a cost-effective scale. The fabrication process deposits a III-V type semiconductor epitaxial layer on a silicon growth substrate, which allows the wafer to be scaled to the same size as traditional silicon wafers (e.g., 300-450 mm diameters). The III-V type semiconductor epitaxial layer is then bonded to a patterned silicon wafer in a wafer-to-wafer bonding procedure. After bonding, the silicon growth substrate is removed or reclaimed, leaving exposed for subsequent processing the III-V type semiconductor epitaxial layer. Processing of the III-V type epitaxial layer allows individual and potentially diverse active optoelectronic devices to be defined and coupled to the previously patterned silicon wafer to which the III-V epitaxy layer is bonded.

This method of fabrication is in contrast to typical coupling of III-V type semiconductor devices with silicon wafers in which III-V type semiconductor devices—not wafers—are individually bonded to a patterned silicon wafer. Not only does this process require precise alignment between the optoelectronic device and the processed silicon wafer but also typically relies on fabrication of the III-V optoelectronic device on III-V type substrates, which are many times as expensive to fabrication as silicon wafers.

Figure 1A:
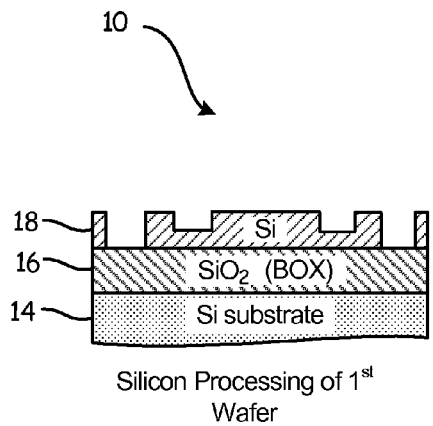
FIGS. 1A-1E are cross-sectional views illustrating fabrication of a photonic integrated circuit via heterogeneous integration of a III-V type semiconductor epitaxy deposited on a silicon wafer and bonded to another silicon substrate wafer according to an embodiment of the present invention.
Figure 1B:
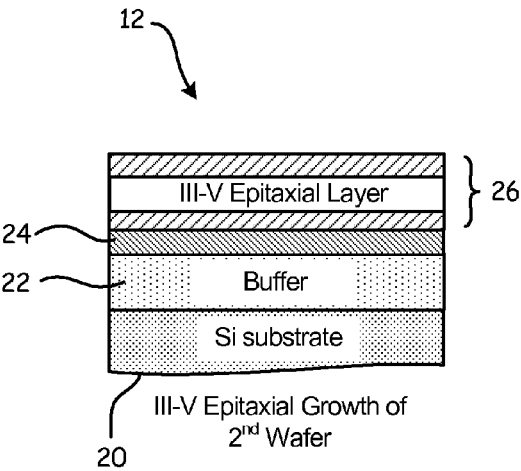
Figure 1C:
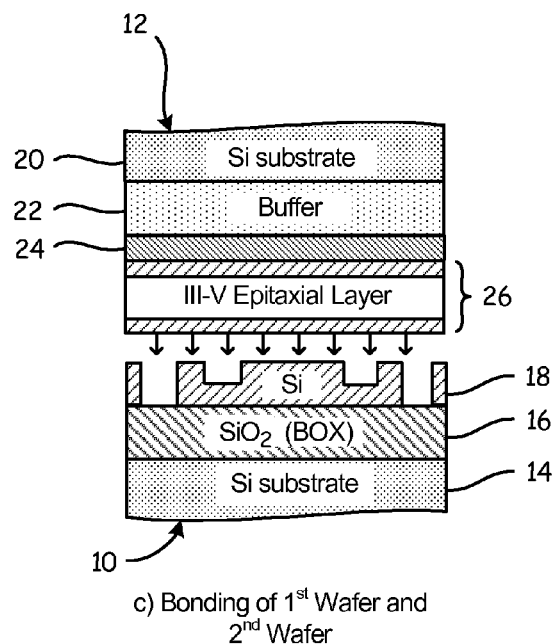
Figure 1D:
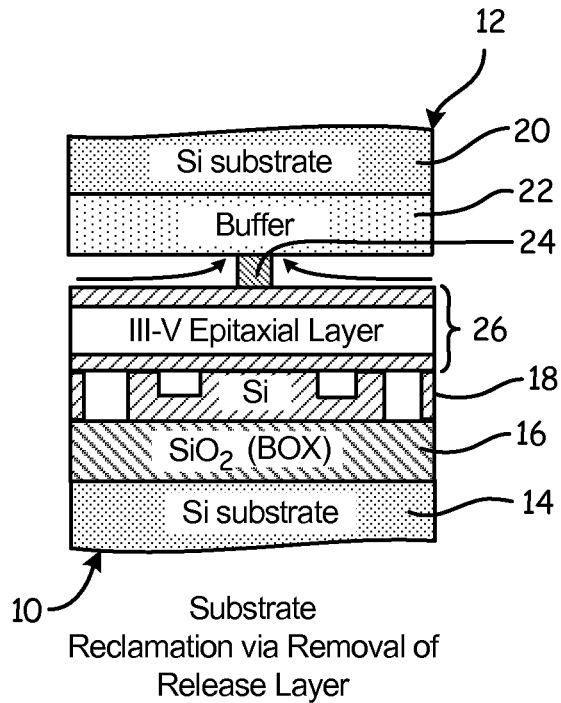
Figure 1E:
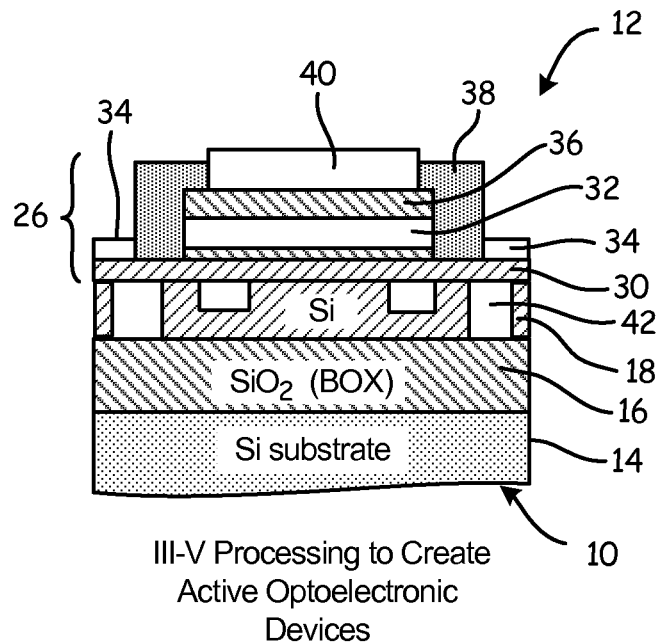

FIGS. 1A-1E are cross-sectional views illustrating fabrication of an photonic integrated circuit (PIC) via heterogeneous integration of a III-V type semiconductor epitaxial layer deposited on a semiconductor wafer, and bonded to another semiconductor wafer according to an embodiment of the present invention. In particular, FIG. 1A illustrates fabrication of first wafer 10, which includes a patterned silicon layer formed on a semiconductor substrate. FIG. 1B illustrates fabrication of a second wafer 12 that includes III-V type semiconductor epitaxial layer deposited on a semiconductor substrate. FIG. 1C illustrates bonding of first wafer 10 with second wafer 12, and in particular to bonding of the III-V type semiconductor epitaxial layer of second wafer 12 to the patterned silicon layer of first wafer 10. FIG. 1D illustrates reclamation of the semiconductor substrate associated with second wafer 12, and FIG. 1E illustrates processing of III-V type semiconductor epitaxial layer from second wafer 12 to define one or more active, optoelectronic devices (e.g., lasers, photodetectors, light-emitting diodes, etc.). In the embodiments shown in FIGS. 1A-1E, the semiconductor substrates associated with first and second wafers are silicon (Si) substrates, selected for the low-cost associated with fabrication. The embodiments shown in FIGS. 1A-1E illustrate fabrication of active photonic integrated circuits (PICs) capable of taking advantage of the low-cost associated with silicon substrates. However, it should be understood that other type of semiconductor substrates may be utilized if so desired.

At the fabrication stage shown in FIG. 1A, first wafer 10 is fabricated to include silicon substrate 14, buried oxide layer (BOX) 16, and patterned silicon layer 18. The embodiment shown in FIG. 1A is referred to as a silicon-on-insulator PIC, wherein silicon layer 18 is patterned as desired to form passive optical devices such waveguides, filters, splitters, etc. in addition to or in conjunction with non-optical devices. For example, the embodiment shown in FIG. 1A may include passive waveguides, wherein light is carried in a core made of pure single-crystal silicon, typically formed in the active region of a silicon-on-insulator (SOI) wafer. However, in other embodiments, passive devices such as waveguides may utilize dielectric waveguides to carry light in a central core made of an amorphous dielectric material, such as silicon nitride or silicon dioxide, which may not require a silicon-on-insulator (SOI) wafer. Embodiments of the present invention may utilize either of these silicon-based photonic integrated circuits, or other well-known silicon-based photonic configurations.

A benefit of silicon-based PICs is that fabrication and processing is conducted via standard and well understood CMOS technology, thereby enabling mass-fabrication and cost reduction due to economies of scale. For example, first wafer 10—with its silicon substrate—may be fabricated as a 300 millimeter (mm) diameter wafer, a 450 mm diameter wafer, or larger if available. Although a silicon-on-insulator type device is illustrated in the embodiment shown in FIG. 1A, other types of silicon based photonic integrated circuits (PICs) may be utilized according to embodiments of the present invention.

At the fabrication stage shown in FIG. 1B, second wafer 12 similarly includes silicon substrate 20, buffer layer 22, release layer 24, and III-V type semiconductor epitaxial layer 26 (referred to herein as III-V epitaxial layer 26). Due to lattice constant differences between materials of different type such as silicon and III-V type materials, attempts to grow III-V type semiconductor layers directly on silicon typically results in a substantial number of defects which significantly degrades material quality and subsequent performance of processed devices. As a result, III-V epitaxial layers are typically grown on a substrate native to its material group (e.g., a III-V substrate as opposed to a silicon substrate). However, III-V type wafers are significantly more expensive than silicon wafers, and are not typically available on the same scale (e.g., 300-450 mm) as silicon wafers.

To overcome these issues, the present invention utilizes buffer layer 22 between silicon substrate 20 and III-V epitaxial layer 26 to accommodate the lattice constant differences. In the embodiment shown in FIG. 1B, silicon substrate 20 is fabricated as a wafer having a diameter equal to the diameter of first wafer 10 shown in FIG. 1A (e.g., 300-450 mm). Buffer layer 22 is deposited on silicon substrate 20, and may include Germanium (Ge), Silicon Germanium (SiGe), Strontium Titanate ($SrTO_3$), Silicon dioxide ($SiO_2$), as well as combinations of one or more of these materials. It should be understood that this list is not exhaustive, and that other such materials may be used to bridge the lattice constant difference of silicon substrate 20 and the III-V epitaxial layer 26. Further, the selection of materials for buffer layer 22 is dependent on the selection of material for III-V epitaxial layer 26, in order to reduce the strain between silicon substrate 20 and III-V epitaxial layer 26.

In the embodiment shown in FIG. 1B, having deposited buffer layer 22 on silicon substrate 20, the III-V epitaxial layer 26 is grown/deposited on buffer layer 22. Epitaxial layer 26 may be comprised of a stack of layers grown/deposited via one or more of Molecular-Beam Epitaxy (MBE), Metal-Organic Chemical Vapor Deposition (MOCVD), Metal-Organic Vapor Phase Epitaxy (MOVPE), Hydride Vapor Phase Epitaxy (HVPE), and/or other well understood crystal growth processes. In one embodiment, III-V epitaxial layer 26 includes heterostructures with quantum dots grown in conjunction with wider band semiconductors. For example, quantum dots comprised of Indium Arsenide (InAs) may be clad or surrounded by Aluminum Gallium Arsenide ($Al_xGa_yAs$) layers. In other embodiments, other configurations and materials may be utilized to form III-V epitaxial layer 26 such as those disclosed in U.S. Pat. No. 7,732,237 titled "Quantum Dot Based Optoelectronic Device and Method of Making Same", by Ya-Hong Xie, incorporated by reference herein. In other embodiments, other quantum structures may be utilized as part of III-V epitaxial layer 26, including quantum dots, quantum wells, quantum wires, quantum dashes.

At this stage in the fabrication process, first wafer 10 (shown in FIG. 1A) has been fabricated and partially or completely processed. Second wafer 12 (shown in FIG. 1B) has been fabricated to include III-V epitaxial layer 26 on silicon substrate 20, but epitaxial layer 26 remains unprocessed. Because both first wafer 10 and second wafer 12 utilized silicon substrates, both can be fabricated on a scale commonly available for fabrication of silicon wafers (e.g., 300 mm-450 mm diameter wafer). As a result of each wafer being the same size, the respective wafers can be bonded to one another, as shown at FIG. 1C. In addition, because III-V epitaxial layer 26 is unprocessed (i.e., no devices have yet been formed within III-V epitaxial layer 26), the alignment between the respective wafers can be relatively coarse. Prior to bonding, however, the respective surfaces to be bond together—patterned silicon layer 18 on first wafer 10 and III-V epitaxial layer 24 on second wafer 12—must be properly prepared. For example, each surface should be sufficiently smoothed/polished to allow a good bond to be formed. For example, a chemical-mechanical polish (CMP) step may be utilized on one or both surfaces prior to bonding the two wafers.

In the embodiment shown in FIG. 1C, second wafer 12 is flipped such that III-V epitaxial layer 26 is oriented to face patterned silicon layer 18. The respective wafers are bonded together using one or more bonding processes, such as hydrophilic, hydrophobic, plasma assisted, solder/metal, and/or polymer (e.g., benzocyclobutene (BCB)) bonding. One of the benefits of the present invention, however, is that both first wafer 10 and second wafer 12 are based on silicon substrates, and therefore share the same coefficient of expansion. As a result, the bonding process may take advantage of high-temperature annealing processes to form the desired mechanical bond between the respective wafers. In addition, because the III-V epitaxial layer 26 has not yet been processed, alignment of the III-V epitaxial layer 26 with patterned silicon layer 18 does not require specific or precise alignment between the respective wafers. Rather, only the subsequent processing of the III-V epitaxial layer 26 need be precise. Because III-V epitaxial layer 26 is bonded directly to patterned silicon layer 18, optical coupling between active optoelectronic devices subsequently formed in III-V epitaxial layer 26 and passive opto-electronic devices formed in patterned silicon layer 18 is straightforward that is, does not require light to pass through intermediate layers for coupling between the respective optical devices.

As described in more detail with respect to FIGS. 2A-2B, some embodiments may require electrical conductivity between patterned silicon layer 18 and optoelectronic devices subsequently formed in III-V epitaxial layer 26. Because both first wafer 10 and second wafer 12 utilize a silicon substrate resulting in similar coefficients of expansion between the respective wafers a high-temperature bonding and annealing process can be utilized to provide electrical conductivity between the respective wafers. Typically, this type of electrical conductivity between bonded wafers requires metal contact pads associated with each wafer or individual device to be aligned prior to soldering or otherwise forming an electrical contact between the respective contact pads.

Following bonding of the respective wafers as shown in FIG. 1C, in the fabrication step shown in FIG. 1D, silicon substrate 20 associated with second wafer 10 is reclaimed for subsequent use. In the embodiment shown in FIG. 1D, release layer 24 is positioned between buffer layer 22 and III-V epitaxial layer 26, and is selectively etched away as shown in FIG. 1D to separate buffer layer 22 and silicon substrate 20 from III-V epitaxial layer 26. For example, in one embodiment, release layer 24 is comprised of Aluminum Arsenide (AlAs), and can be selectively etched via hydrofluoric acid (HF), without damaging or otherwise removing III-V epitaxy layer 26. In another embodiment (not shown), rather than attempt to reclaim silicon growth substrate 20, both the growth substrate 20 and buffer layer 22 are etched and/or mechanically lapped and then the remaining ~10 s microns of Si can be selectively etched. At the end of this fabrication step, III-V epitaxial layer 26 is exposed to allow for subsequent processing of the III-V epitaxial layer.

At the fabrication step shown in FIG. 1E, III-V epitaxial layer 26 is processed to create the desired active optoelectronic devices, such as lasers, photodetectors, light-emitting diodes, etc. In the embodiment shown in FIG. 1E, the completed photonic integrated circuit includes silicon substrate 14, buried oxide layer (BOX) 16, patterned silicon layer 18, patterned III-V epitaxial layer 26, which in this embodiment includes III-V type semiconductor spacer layer 30, III-V type semiconductor quantum structure layer 32, contacts 34, bulk semiconductor layer 36, insulator material 38, and contact 40.

In addition, the bonding of patterned silicon layer 18 to III-V type epitaxial layer 26 results in the creation of a number of gaps 42 within the patterned silicon layer that in this embodiment serve as waveguides for light created by the active regions within the III-V type epitaxial layer 26. Gaps 42 may be air gaps (as shown in FIG. 1E), or may utilize one or more materials to form the desired waveguide, such as silicon oxide, silicon oxynitride, silicon nitride, etc. In addition, the shape of gaps 42 may be linear (in a direction into the page) or in the form of others shapes such as bends, rings, and/or discs depending on the function of the particular waveguide.

In the embodiment shown in FIG. 1E, the combination of III-V spacer layer 36, III-V quantum structure layer 32, contacts 34 and 40 and bulk semiconductor layer 36 form an optically active region that may be incorporated into devices such as light emitting diodes, laser diodes, photodetectors, modulators, phase tuning elements, interferometric devices, wavelength multiplexers, polarization splitters, couplers, and/or saturable absorbers. In some embodiments, the active optoelectronic devices found within III-V epitaxial layer 26 are optically coupled to passive optical devices (e.g., waveguides) formed in patterned silicon layer 18 associated with first wafer 10. However, while optical coupling is possible in other embodiments, no coupling is required between patterned silicon layer 18 and devices formed in III-V epitaxial layer 26. In still other embodiments such as that shown in FIGS. 2A-2B, bonding of the first wafer and second wafer includes electrically coupling patterned silicon layer 18 (or metal contacts formed thereon) with active optoelectronic devices formed in III-V epitaxial layer 26.

Benefits of the embodiment shown in FIGS. 1A-1E include the ability to utilize wafers with silicon substrates as opposed to the more expensive III-V type substrates. As a result of both wafers utilizing the same substrate material—and therefore sharing the same coefficient of thermal expansion—the wafers can be bonded together using high temperature bonding/annealing processes. Finally, the III-V epitaxial layer 26 is not processed until after the wafers have been bonded. As a result, bonding of the wafers does not require precise alignment of the wafers as is required when bonding a processed device to a wafer.

Figure 2A:
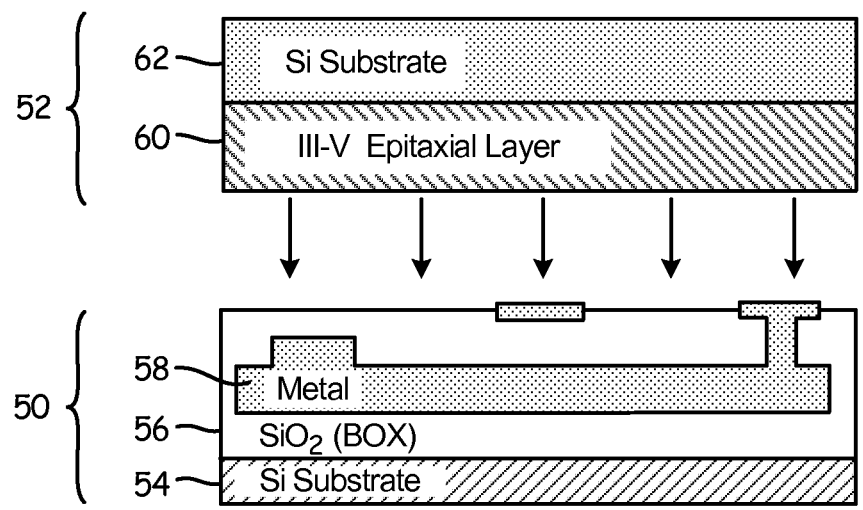
FIGS. 2A-2B are cross-sectional views illustrating in additional detail the bonding of a wafer having a silicon substrate and a III-V epitaxial layer with another silicon wafer according to an embodiment of the present invention.
Figure 2B:
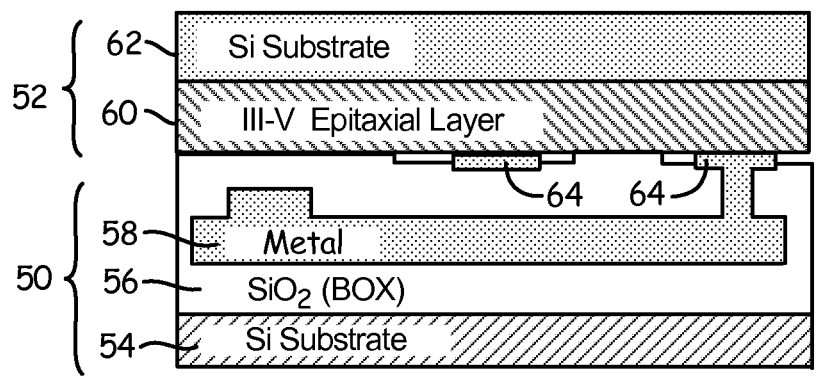

FIGS. 2A-2B are cross-sectional views illustrating in additional detail the bonding of first wafer 50 to second wafer 52 according to an embodiment of the present invention, wherein the second wafer once again includes a III-V type semiconductor epitaxial layer formed on a silicon substrate. In particular, the embodiment shown in FIGS. 2A-2B illustrates the capability of bonding between semiconductor material (such as III-V type semiconductor material) and metal. As a result, electrical coupling or conductivity paths can be created between first wafer 50 and second wafer 52, in addition to optical coupling described with respect to FIGS. 1A-1E. Typically, mechanical bonding is done between semiconductors, and electrical bonding is done between respective metal contacts. The embodiments shown in FIGS. 2A-2B provides for bonding between semiconductor and metal. In the embodiment shown in FIGS. 2A-2B, first wafer 50 includes silicon substrate 54, buried silicon dioxide layer ($SiO_2$) 56, and metal layer 58. In addition, second wafer 52 includes III-V epitaxial layer 60 and silicon growth substrate 62. The embodiment shown in FIG. 2A-2B may be utilized in conjunction with the fabrication steps described with respect to FIGS. 1A-1E.

Typical bonding between devices requires alignment between metal contacts fabricated on each processed device, which again requires precise alignment between the respective devices. Because the present invention takes advantage of bonding the III-V epitaxial layer to the patterned silicon substrate, precise alignment is not required.

In the embodiment shown in FIG. 2A, first wafer 50 is bonded to second wafer 52. The bonding process utilizes one or more well-known bonding techniques such as plasma-assisted bonding, followed by an anneal process under pressure. The bonding may utilize bonding techniques such as plasma-assisted bonding combined with annealing under pressure to form the requisite mechanical bond between the respective wafers. As a result of this process, covalent bonds are formed between silicon dioxide layer 56 and III-V epitaxial layer 60.

In addition to the covalent bonds formed between the respective semiconductor materials of each wafer, a bond is also formed between metal layer 58 and III-V epitaxial layer 60 to provide an electrically conductive coupling or path between the respective wafers. In particular, in the embodiment shown in FIGS. 2A-2B, metal layer 58 includes thin contact portion 64 located on a surface of first wafer exposed to bonding with second wafer 52. Thin contact portion 64 may be formed within silicon dioxide layer 56 such that at least a small portion of thin contact portion 64 extends beyond the silicon dioxide layer 56. During the bonding and annealing process, interdiffusion occurs between thin contact portion 64 and III-V epitaxial layer 60 to form a bond between the two layers. Thin metal contact portion 64 will both expand and then contract during heating and cooling associated with the bonding/annealing process, resulting in small areas surrounding each thin metal contact portion 64 that is not bonded to III-V epitaxial layer 60. However, the net result of this process is that bonding—via covalent bonds—is provided between semiconductor materials and bonding—via interdiffusion—is provided between metal contacts and a semiconductor material such as III-V epitaxial layer 60 to provide both a mechanical and electrical bond between the respective first and second wafers. Although not shown in FIGS. 2A and 2B, metal layer 58 may also extend to silicon substrate 54, and contacts may be included therein to allow an electrical connection to be formed between first wafer 50 and an external device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating a heterogeneous semiconductor wafer, the method comprising:
    depositing a III-V type semiconductor epitaxial layer on a first wafer having a semiconductor substrate;
    bonding the first wafer to a second wafer having a patterned silicon layer formed on a semiconductor substrate, wherein the III-V type semiconductor epitaxial layer is bonded to the patterned silicon layer of the second wafer, and wherein the second wafer includes a metal layer that includes a thin contact metal stack on top of the patterned silicon layer, and wherein bonding includes annealing under pressure to form covalent bonds between the patterned silicon layer and the III-V type semiconductor epitaxial layer and interdiffusion between the thin contact metal stack and the III-V type semiconductor epitaxial layer; and
    removing the semiconductor substrate associated with the first wafer to expose the III-V type semiconductor epitaxial layer.

2. The method of claim 1, further including:
    depositing a buffer layer on the semiconductor substrate associated with the first wafer, wherein the III-V type semiconductor epitaxial layer is deposited on the buffer layer.

3. The method of claim 1, wherein the buffer layer comprises one or more of Germanium (Ge), Silicon Germanium (SiGe), Strontium Titanate ($SrTO_3$), and Silicon Dioxide ($SiO_2$).

4. The method of claim 1, wherein the III-V type semiconductor epitaxial layer comprises one or more of quantum dots, quantum wells, quantum wires, quantum dashes.

5. The method of claim 1, further including:
    processing the exposed III-V type semiconductor epitaxial layer following removal of the semiconductor substrate to form one or more active optoelectronic devices coupled to the patterned silicon layer.

6. The method of claim 5, wherein the one or more active optoelectronic devices includes one or more laser, photodetector, modulator, phase tuning element, interferometric device, wavelength multiplexer, polarization splitter, coupler, or saturable absorber.

7. The method of claim 5, wherein the patterned silicon layer includes one or more passive optical components coupled to the one or more active optoelectronic devices formed within the III-V type semiconductor epitaxial layer.

8. The method of claim 7, wherein the passive optical components include one or more of waveguides, filters, and/or splitters.

9. The method of claim 1, wherein the second wafer is a silicon-on-insulator wafer that includes a silicon substrate, a buried oxide layer deposited on the silicon substrate, and the patterned silicon layer formed on the buried oxide layer.

10. The method of claim 1, wherein bonding the first wafer to the second wafer includes providing electrical conductivity between the patterned silicon layer and the III-V type semiconductor epitaxial layer.

11. The method of claim 1, wherein the bonding process is selected from the group consisting of: hydrophilic bonding, hydrophobic bonding, plasma assisted bonding, solder bonding, metal bonding, and polymer bonding (e.g., benzocyclobutene bonding).

12. The method of claim 1, wherein the semiconductor substrates associated with the first and second wafers, respectively, are silicon substrates.

13. The method of claim 2, further including depositing a release layer on the buffer layer prior to depositing the III-V type semiconductor epitaxial layer.

14. The method of claim 13, further including selectively etching the release layer positioned between the buffer layer and the III-V epitaxial layer to separate the buffer layer and the silicon substrate from the III-V epitaxial layer.

* * * * *